Aug. 21, 1951  R. BEACOM  2,564,666
RELEASING THREADING TOOL HOLDERS
Filed March 20, 1945
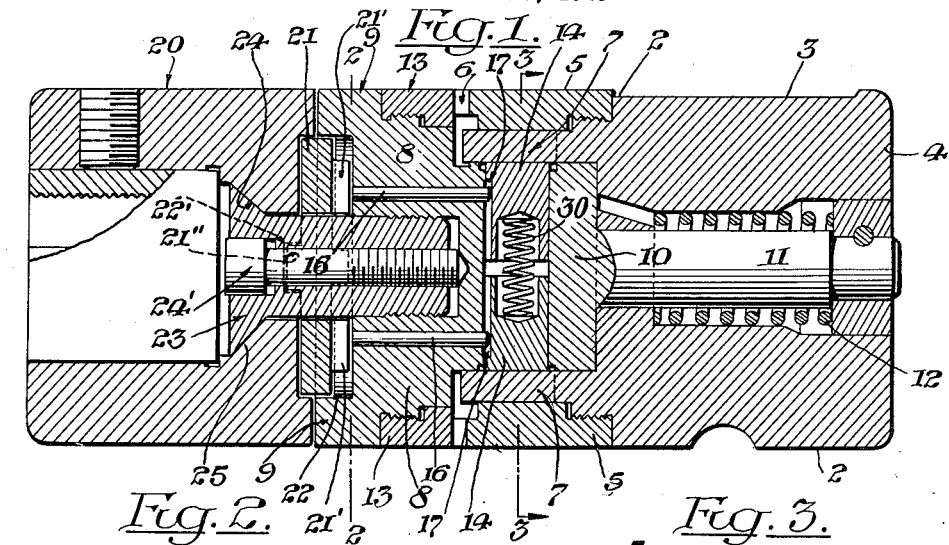
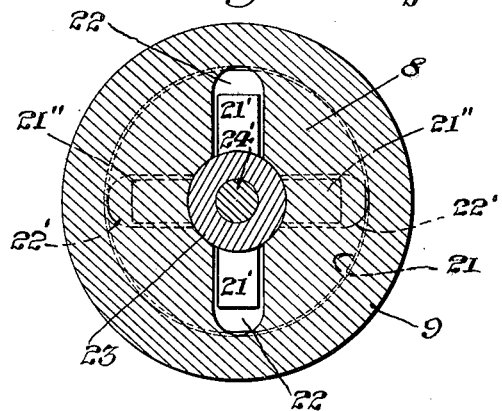
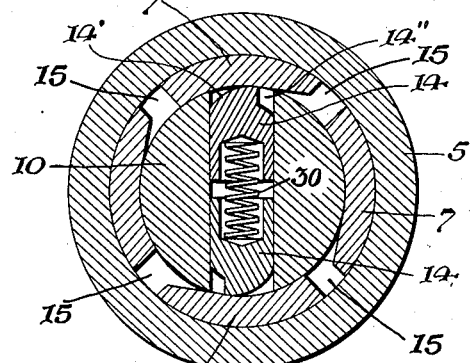
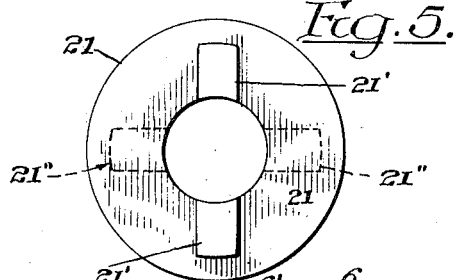
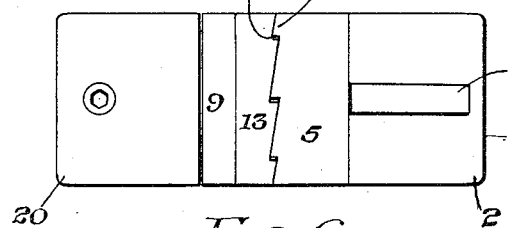
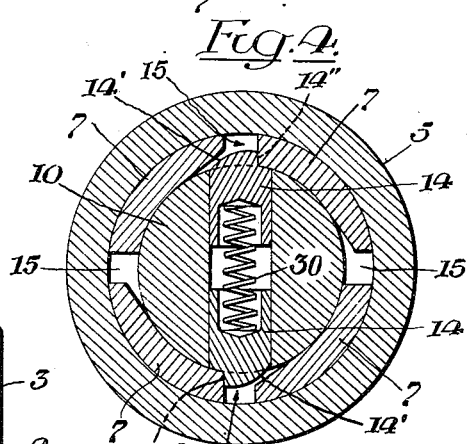
INVENTOR
Robert Beacom
BY
ATTORNEY Patented Aug. 21, 1951

2,564,666

UNITED STATES PATENT OFFICE 2,564,666

RELEASING THREADING TOOLHOLDERS

Robert Beacom, Cleveland, Ohio, assignor to The National Acme Company, Cleveland, Ohio, a corporation of Ohio Application March 20, 1945, Serial No. 583,668

3 Claims. (Cl. 10—89)

1

This invention relates to threading tool holders, and particularly to that type designated as releasing threading tool holders adapted to hold a tap or die, the object of the invention being to provide an improved threading tool holder of this type with a floating head for the reception of the tap or die and whereby, should the tap or die spindle not be in perfect alignment with the work spindle, the tap or die can properly locate or adjust itself, and which tool holder is simple in construction and efficient in operation, this improved threading tool holder being an improvement on that shown and described in my contemporaneously pending application, Serial Number 568,535, filed December 16, 1944, issued as Patent No. 2,528,107 on October 31, 1950.

In the drawings accompanying and forming a part of this specification,

Fig. 1 is a longitudinal sectional view of this improved threading tool holder illustrating the position of the parts during the tapping operation.

Fig. 2 is a cross-sectional view on line 2—2 of Fig. 1.

Fig. 3 is a cross-sectional view on line 3—3 of Fig. 1 and illustrating the driving connections or plungers released from the slots of the outer spindle.

Fig. 4 is also a cross-sectional view on line 3—3 of Fig. 1 and illustrating the interlocking of the inner and outer spindles by the spring pressed plungers.

Fig. 5 is a face view of the floating connecting disk for connecting the floating head with the inner spindle and Fig. 6 is an exterior view of the holder.

Similar reference characters indicate corresponding parts in the several views.

Before explaining in detail the present improvement and its mode of operation, I desire it understood that the present invention is not limited to the details of construction and arrangement of parts illustrated in the accompanying drawings since the invention is capable of other embodiments, and that the phraseology employed is for the purpose of description and not of limitation.

This improved threading tool holder comprises an outer spindle 2 made up of a body 3 having a bored shank 4 adapted to be fastened to a rotary spindle such, for instance, as a tap or die spindle of an automatic machine, and a ring or shell 5 threaded to the body and provided with clutch teeth 6. This annular ring 5 encircles an annular

2 forwardly extending chambered portion or housing 7 of the body.

The tool holder also has an inner or releasing spindle 8 having a head 9 and a hub 10 extending into the chambered portion or housing 7 of the body 3 and provided with a shank 11 extending into the bored shank 4 of the body 3. On this shank 11 is a coiled spring 12 effective to permit lengthwise shiftable movement of the inner spindle relative to its outer spindle, the coiled spring acting to pull back the inner spindle at a predetermined time to re-engage the clutch teeth and thus reset the tool. Threaded to the inner spindle is a ring 13 having cooperating clutch teeth 6'.

Carried by the inner spindle is a pair of transversely extending spring pressed pins or plungers 14, the outer ends of which are tapered as at 14' and also notched as at 14", the taper of one pin and its notch being opposite to the taper and notch of the other pin. These tapered ends permit proper rotation or retardation of the inner spindle relative to the outer spindle at a predetermined time while the notched ends engage in slots 15 of the housing 7 of the outer spindle at the proper time to drive the inner spindle with the outer spindle, thus forming what may be considered a spring-acting clutch.

These pins are held and guided in proper position by suitable guide pins 16 located in the inner spindle head and projecting into slots 17 of the plungers 14 and, as before stated, the ends of these spring-pressed plungers are in position to cooperate with slots or recesses 15 of the housing 7 of the outer spindle.

In practice, for left-hand threading of the work, the threading tool when used as a tap is rotated in to the work at a slightly higher speed than the work but at a lower speed in the same direction to screw or back off the tap from the work. For right-hand threading, this is reversed, the tap being rotated lower than the work to thread and higher to back it off but in the same direction. For right-hand threading, however, the clutch teeth 6—6' are reversed.

In the operation of this improved threading tool holder when used as a tap, when the tap enters the work, the clutch teeth 6—6' form a driving connection between the inner spindle 8 and the outer spindle 2 so as to rotate the tap to thread the work, the clutch teeth 6—6' doing this driving until the tap reaches a predetermined depth of thread in the work, at which time, forward movement of the die spindle is stopped, but not its rotation, by the usual means such as a stop rod provided for the purpose and fastened to the framework of the machine. When the die or tap spindle is stopped in its forward travel, the inner spindle 8, because of its engagement with the work, is pulled forward relative to the housing of the outer spindle 2 approximately 3/16" against the action of the coil spring 12, separating the driving clutch teeth 6—6' and so permitting the inner spindle to rotate with the work independently of the outer spindle and until, during this forward movement of the inner spindle 8, the pins or plungers 14 are pressed outwardly by their spring 30 and project into a pair of the slots 15 of the inner housing which thus again connect the inner spindle 8 with the outer spindle 2 whereupon when the usual clutch is shifted to rotate the die spindle and the tap at a lower speed than that of the work for left-hand threading, these pins or plungers 14 act as a brake and so retard the inner spindle and thus back off or remove the tap from the work. The tap is reset by the coil spring 12 which, as soon as the tap backs off or rotates free of the work, draws the inner spindle 8 back again. The meshing of the clutch teeth rotates the inner spindle, thereby compressing the plungers or pins 14, whereupon the tap is in readiness for another tapping operation.

As it sometimes happens that the tap or die spindle to which the tool holder is secured gets out of proper alignment with the spindle carrying the work due to the strain or stress of operation, therefore, to provide or compensate for this, this improved tool holder is provided with a floating head 20 so that if the tap or die spindle is not in perfect alignment with the work spindle, the tap or die can locate or adjust itself by means of this floating head which is constructed to carry the threading tool such as a tap or die.

Between this floating head and the head 9 of the inner spindle is located a floating washer or disk 21 having a series of radial lugs located in pairs, a pair on each side or face as 21' and 21'', the lugs of each pair being located 180 degrees apart and, therefore, opposite each other to obtain the correct float and permit the head to float in all directions. The lugs 21' fit into radial recesses 22 formed in the front wall of the head 9 while the lugs 21'' fit into similar recesses 22' formed on the rear wall of the floating head 20.

These lugs form a driving connection between the floating head 20 and the head 9 of the releasing inner spindle 8 and thus form drivers from the head 9 to the head 20 without building up a binding action which would prevent the floating front head 20 from floating freely.

The floating head is secured to the releasing inner spindle by means of a threaded adjusting screw 23 threaded into the head 9. The head of this screw 23 is tapered as at 24 to engage a similar tapered wall 25 of the floating head 20 so that by adjusting this screw, the floating head 20 is allowed to float more or less depending upon the misalignment between the die spindle and the tool holder spindle. When the screw 23 is adjusted to give the head the required float, a lock screw 24' is screwed down against the releasing tap spindle head 9 and thus jams the screw 23 forwardly on its threads so that the whole acts as one unit with the floating head driven by the floating washer or disk, the amount of float being controlled by the taper of the adjusting screw 23.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same although without attempting to set forth all of the forms in which it may be made or all of the modes of its use, I claim:

1. In a releasing threading tool holder, an outer spindle having an inner housing provided at intervals therearound with recesses, said outer spindle also being provided at its forward end with clutch teeth, an inner spindle carried within the outer spindle and having a clutch toothed ring on the end thereof engageable with the clutch teeth on the forward end of the outer spindle, a bored shank on said outer spindle, said inner spindle having an outer end and a threaded opening, radial recesses on said outer end about said opening, a tool supporting member having radial recesses therein facing said radial recesses in said outer end, screw means extending in said threaded opening and in said member to floatingly support said member, a set screw in said screw means tightenable against said inner spindle to regulate the amount of float of said support member, a disk having lugs on each side thereof, the lugs on one side extending into the recesses in the floating head and the lugs on the other side extending into the recesses in said inner spindle, a shank on said inner spindle projecting through said bored shank of the outer spindle, a coil spring interengaging said shanks to permit and control lengthwise shiftable movement of the inner spindle relative to the outer spindle, a threading tool receiving bore in said tool supporting member, a pair of transversely extending spring pressed plungers carried by said inner spindle, said plungers having the outer ends thereof extendable into the recesses in the inner housing, a coil spring compressed between said plungers and tending to separate them to project the ends thereof into the recesses when the plungers are aligned with the recesses, said plungers extending transversely of the shank of said inner spindle and being positioned between the threading tool receiving bore and the coil spring interengaging the shanks.

2. In a releasing threading tool holder, a hollow outer spindle having recesses internally thereof and spaced at intervals thereabout, a bored shank on one end of said outer spindle, a replaceable drive clutch ring on the other end of said outer spindle, an inner spindle carried within the outer spindle and having an outer end and a threaded opening, radial recesses on said outer end about said opening, a tool supporting member having radial recesses therein facing said radial recesses in said outer end, screw means extending in said threaded opening and in said member to floatingly support said member, a disk having lugs on each side thereof, the lugs on one side extending into the recesses in the floating head and the lugs on the other side extending into the recesses in said inner spindle, a clutch ring replaceably mounted on said inner spindle and drivingly engageable with said drive clutch ring, an inner shank on said inner spindle extending through said bored shank of said outer spindle, a clutch spring interengaging said shanks and tending to hold said clutch rings in engagement, and a pair of transversely extending plungers carried by said inner spindle in alignment with said recesses between said tool receiving holder and said shank, a spring extending between said plungers and urging said plungers apart to project the plungers into the recesses when the plungers are aligned with the recesses.

3. In a releasing threading tool holder, a hollow outer spindle having recesses internally thereof and spaced at intervals thereabout, a bored shank on one end of said outer spindle, a replaceable drive clutch ring on the other end of said outer spindle, an inner spindle carried within the outer spindle and having an outer end and a threaded opening, radial recesses on said outer end about said opening, a tool supporting member having radial recesses therein facing said radial recesses in said outer end, screw means extending in said threaded opening and in said member to floatingly support said member, a set screw in said screw means tightenable against said inner spindle to regulate the amount of float of said support member, a disk having lugs on each side thereof, the lugs on one side extending into the recesses in the floating head and the lugs on the other side extending into the recesses in said inner spindle, a clutch ring replaceably mounted on said inner spindle and drivingly engageable with said drive clutch ring, an inner shank on said inner spindle extending through said bored shank of said outer spindle, a clutch spring interengaging said shanks and tending to hold said clutch rings in engagement, and a pair of transversely extending plungers carried by said inner spindle in alignment with said recesses between said threaded opening and said shank, said plungers having the outer ends thereof tapered and extendable into the recesses, a spring extending between said plungers and urging said plungers apart to project the tapered ends of said plungers into the recesses when the plungers are aligned with the recesses.

ROBERT BEACOM.

REFERENCES CITED

The following references are of record in the file of this patent:

UNITED STATES PATENTS

| Number | Name | Date |
|---|---|---|
| 211,742 | Johnston | Jan. 28, 1879 |
| 560,083 | Carpenter | May 12, 1896 |
| 713,004 | Hunter | Nov. 4, 1902 |
| 1,220,149 | Williams | Mar. 20, 1917 |
| 1,254,933 | Peuch et al. | Jan. 29, 1918 |
| 1,290,427 | Velk | Jan. 7, 1919 |
| 1,317,008 | Dohner et al. | Sept. 23, 1919 |
| 1,346,295 | Burger et al. | July 13, 1920 |
| 1,376,791 | Baker et al. | May 3, 1921 |
| 1,740,887 | Crosby | Dec. 24, 1929 |
| 1,883,611 | De Vlieg | Oct. 18, 1932 |
| 1,952,425 | Ecker | Mar. 27, 1934 |
| 2,017,332 | Zempel | Oct. 15, 1935 |
| 2,287,192 | Mueller | June 23, 1942 |
| 2,333,868 | Kylin | Nov. 9, 1943 |
| 2,363,379 | Allen | Nov. 21, 1944 |

FOREIGN PATENTS

| Number | Country | Date |
|---|---|---|
| 125,797 | Great Britain | May 1, 1917 |